(12) United States Patent
Kuehhorn et al.

(10) Patent No.: US 8,171,632 B2
(45) Date of Patent: May 8, 2012

(54) METHOD OF MANUFACTURING INTEGRALLY DESIGNED ROTOR WHEELS TO EXHIBIT AN ESSENTIALLY IDENTICAL NATURAL FREQUENCY AND MASS USING CHEMICAL ETCH MACHINING

(75) Inventors: Arnold Kuehhorn, Berlin (DE); Thomas Klauke, Lübbenau/Spreewald (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 578 days.

(21) Appl. No.: 12/314,272

(22) Filed: Dec. 8, 2008

(65) Prior Publication Data
US 2009/0144981 A1 Jun. 11, 2009

(30) Foreign Application Priority Data
Dec. 6, 2007 (DE) .................. 10 2007 059 155

(51) Int. Cl.
*B44C 1/22* (2006.01)
*B21K 1/36* (2006.01)
*B21K 3/04* (2006.01)

(52) U.S. Cl. ............ 29/889.23; 216/100; 216/108; 216/109; 29/889.2; 29/889.1; 29/407.1; 29/407.07; 702/56; 702/85; 416/144; 416/203; 416/223 R; 416/223 A

(58) Field of Classification Search .......... 29/889.2, 29/407.05, 407.07, 407.08, 557; 416/144, 416/234; 720/56; 216/83, 96, 100; F01D 5/16; G01M 1/32, 1/38
See application file for complete search history.

(56) References Cited

U.S. PATENT DOCUMENTS

| | | | | |
|---|---|---|---|---|
| 2,916,258 A * | 12/1959 | Klint | .............. | 416/203 |
| 3,536,417 A * | 10/1970 | Merkle et al. | ........... | 416/223 R |
| 4,900,398 A | 2/1990 | Chen | | |
| 6,042,338 A | 3/2000 | Brafford | | |
| 6,340,424 B1 * | 1/2002 | Elman et al. | .......... | 205/645 |
| 6,354,780 B1 * | 3/2002 | Davis et al. | ............ | 414/146 |
| 6,471,482 B2 * | 10/2002 | Montgomery et al. | ...... | 416/203 |
| 6,478,545 B2 * | 11/2002 | Crall et al. | ............ | 416/213 R |
| 6,754,954 B1 * | 6/2004 | Decker | ............ | 29/889 |
| 6,814,543 B2 * | 11/2004 | Barb et al. | ............ | 416/1 |
| 7,024,744 B2 * | 4/2006 | Martin et al. | ............ | 29/401.1 |
| 7,082,371 B2 * | 7/2006 | Griffin et al. | ............ | 702/56 |
| 7,206,709 B2 * | 4/2007 | Griffin et al. | ............ | 702/85 |
| 7,383,136 B1 * | 6/2008 | Griffin et al. | ............ | 702/56 |
| 7,500,299 B2 * | 3/2009 | Dupeux et al. | ............ | 29/407.07 |
| 7,953,561 B2 * | 5/2011 | Musial et al. | ............ | 702/42 |
| 2002/0067991 A1 * | 6/2002 | Montgomery et al. | ...... | 416/203 |
| 2002/0125215 A1 * | 9/2002 | Davis et al. | ............ | 216/100 |
| 2004/0045936 A1 * | 3/2004 | Davis et al. | ............ | 216/100 |
| 2004/0243310 A1 * | 12/2004 | Griffin et al. | ............ | 702/10 |
| 2005/0160598 A1 * | 7/2005 | Heilenbach et al. | ........ | 29/889.2 |
| 2005/0278127 A1 * | 12/2005 | Griffin et al. | ............ | 702/56 |
| 2008/0134504 A1 * | 6/2008 | Schoenenborn | ........... | 29/889.1 |
| 2009/0035138 A1 * | 2/2009 | Harrison et al. | .......... | 416/204 A |
| 2011/0041334 A1 * | 2/2011 | Berlanger et al. | ......... | 29/889.23 |

FOREIGN PATENT DOCUMENTS

| | | |
|---|---|---|
| DE | 102005006414 A1 | 8/2006 |
| EP | 1239059 | 9/2002 |
| EP | 1239059 A2 | 9/2002 |
| JP | 54114619 A | 6/1979 |
| JP | 54114619 | 9/1979 |
| JP | 54114619 A * | 9/1979 |
| WO | 2006084438 | 8/2006 |

OTHER PUBLICATIONS

European Search Report dated Sep. 4, 2009 from counterpart European patent application.

* cited by examiner

*Primary Examiner* — David Bryant
*Assistant Examiner* — Jason L Vaughan
(74) *Attorney, Agent, or Firm* — Timothy J. Klima; Shuttleworth & Ingersoll, PLC

(57) ABSTRACT

In the manufacture of integrally designed rotor wheels (BLISKs), the natural frequency of each blade is measured after forming by conventional shaping methods and the respective blade mass and its divergence from the smallest blade mass is calculated therefrom. The mass of each blade exceeding the smallest blade mass is removed by means of an etchant, so that all blades have essentially corresponding thickness, chord length, mass and natural frequency and are evenly loaded in operation. BLISKs manufactured in this way feature a long service life.

8 Claims, No Drawings

METHOD OF MANUFACTURING INTEGRALLY DESIGNED ROTOR WHEELS TO EXHIBIT AN ESSENTIALLY IDENTICAL NATURAL FREQUENCY AND MASS USING CHEMICAL ETCH MACHINING

This application claims priority to German Patent Application DE10 2007 059 155.3 filed Dec. 6, 2007, the entirety of which is incorporated by reference herein.

This invention relates to a method for the manufacture of integrally designed rotor wheels for compressors and turbines, especially for gas-turbine engines, in which the rotor wheels, which comprise a disk with peripherally formed-on rotor blades, are manufactured by conventional shaping methods and the thickness and chord length of the blades are subsequently reduced by chemical processing in an etchant.

In compressor and turbine engineering, in particular in the aircraft engine sector, integrally formed rotor wheels, termed BLISKs, are increasingly used. Compared with the conventional design, where separately manufactured rotor blades are held in grooves on the disk periphery, integrally formed rotor wheels have reduced mass and are thus capable of higher rotational speeds, providing for improved pressure ratios and more powerful engines. Furthermore, no leakage losses occur in the area of the blade root. Due to the one-piece configuration and the rigid connection of disk and blades, BLISKs are to be regarded as more susceptible to disturbances of the rotational symmetry, i.e. imbalance of the entire structure. This peculiarity of BLISK-type rotor wheels, which is also referred to as mistuning, is reflected in specific disk and blade properties which are due to the manufacturing process and to material inhomogeneities and entails characteristic vibration amplitude and strain excesses in the blades due to aerodynamic excitation, resulting in fatigue affecting the service life of the rotor wheels.

A method has already been proposed which enables the natural frequencies of the individual blades of a BLISK to be determined close to reality to identify—on the basis of the measurement of the deviations of the blade natural frequencies from the average of all blade natural frequencies—production-inherent disturbances of the rotational symmetry of a rotor wheel and to draw conclusions on the vibrational behavior of the BLISK under operating conditions and its operational safety and service life.

From Specification EP 1239059 A2, a method for balancing integrally designed rotor wheels produced by shape cutting is known in which the thickness and the chord length of at least one blade are reduced by stock removal in an etching solution. The amount of stock removal at the blade surface is controlled by the duration of treatment in an etching bath. If the reduction in thickness, and thus, for the purpose of balancing, the reduction in weight, is to be confined to only one of several blades immersed in the etching bath, the other blades are covered by a masking agent which is chemically resistant to the etchant.

In a broad aspect the present invention provides a method for the manufacture of integrally designed gas-turbine engine compressor or turbine rotor wheels produced by cutting and/or electrochemical machining and/or friction welding whose blades have essentially corresponding maximum vibration amplitudes and low blade loading, thus ensuring a long service life of the rotor wheels.

The basic idea of the present invention is to measure, upon manufacture of the rotor wheel by conventional shaping methods, for example milling, the natural frequency of the blades, which is essentially determined by the blade thickness and the chord length, and to calculate from the respective natural frequency, the corresponding blade mass. Starting out from the blade with the minimum blade mass, the particular blade mass deviation of each of the other blades from the blade with the minimum blade mass is determined and removed from the respective blade in an etching process so that all blades have essentially corresponding blade mass and blade natural frequency, actually on the basis of the minimum blade mass and blade natural frequency. Thus, excessive amplitudes and extreme blade loads can largely be avoided and, consequently, the life of the rotor wheel so produced can be increased. Another advantageous effect of the corresponding centrifugal loading of all blades via reduction of the masses of the blades to a minimum corresponding blade mass is that a possible rotor wheel imbalance is reduced as the imbalance share caused by the blades is eliminated.

In accordance with a further feature of the present invention, stiffening and natural frequency increase of the strain-gauged blades of a test rotor wheel tested prior to series production is eliminated in that the blade thickness and chord length of the respective blades of the test rotor wheel are further reduced in the etching treatment in correspondence with the increase in natural frequency to be expected from the strain gauges. Thus, application of strain gauges does not invalidate the measuring result in test operation.

Reduction of blade thickness and chord length by the respective amount required is controlled by the concentration of the etchant and the duration of exposure of the blade.

In a further development of the present invention, each blade is individually treated in an etchant-filled tank which is adapted to the size of the blade.

The rotor wheel can be immersed partly in the etching bath for separate stock removal on each individual blade, but also completely, provided that the disk and all other—already treated or not yet to be treated—blades are protected against the etchant by a chemically resistant masking agent.

With complete immersion of the rotor wheel in the etching bath, the respective minimum blade mass deviation from the minimum blade mass can, in an advantageous development of the etching method, be removed in successive etching steps. In this case, the disk is covered by a masking agent and, prior to each etching step, the blade with the minimum mass or, respectively, the already treated blades whose mass is already reduced to minimum are protected against the action of the etchant by applying a masking agent.

In development of the present invention, the natural frequency of the blades is determined in that each blade is, individually and to a reproducible amount, excited by a modal hammer and the respective natural frequency of the blade is measured in a contactless (contact free) manner, using a laser vibrometer, in a state in which the blade is largely decoupled from the other blades. Decoupling from the other blades during measurement of the natural frequency is accomplished in that all other, not measured blades are detuned by use of an additional mass temporarily applied to them.

The integrally designed rotor wheel is formed by known machining methods, for example milling, electrochemical machining or friction welding.

An embodiment of the present invention is more fully described in the following.

First, a BLISK-type rotor wheel for a compressor stage of a gas-turbine engine with, for example, 25 rotor blades integrally formed on a disk, is produced by conventional methods, for example milling. Due to production-inherent variations in geometry and/or material inhomogenities, the blades feature different natural frequencies, so that the maximum blade amplitudes and blade stresses vary between blades and, in operation, the blades would be subject to different and partly very strong loads—resulting in reduced service life.

In the next step, the natural frequency of each individual blade is measured in a state in which it is largely decoupled from the other blades. For decoupling, the blades not under investigation are additionally strongly detuned by applying an identical additional mass. Then, using a modal hammer, the blade under investigation is set into an excitation state which is reproducible in the investigation of the other blades and the natural frequency of the blade is measured contactless using a laser vibrometer.

Upon determining the blade natural frequency $f_{blade}$ for all blades of the rotor wheel in the above manner, the particular, individual blade masses $m_{blade}$ are determined via the relation $$m_{blade} = f(f_{blade})$$

existing between the blade natural frequency and the blade mass $m_{blade}$.

On the basis of the minimum blade mass determined of all investigated blades, i.e. using the blade with the minimum natural frequency and, accordingly, the minimum blade mass $m_{blade\ min.}$ as a reference, the stock mass $$\Delta m_{stock\ to\ be\ removed} = m_{blade} - m_{blade\ min.}$$

to be individually removed from each single blade is now calculated.

In the following step, the respective amount of stock exceeding the minimum blade mass is removed from the individual blades in an etching process, so that all blades have approximately equal thickness, chord length and mass and, thus, equal natural frequency, thus preventing differences in blade loading. The amount of stock removal is controlled by the duration of etching and the concentration of the etching solution. The amount of stock removal can be checked by interim measurement of the blade natural frequency according to the aforementioned measuring method.

In accordance with a first variant, stock is removed by individually immersing the respective blade in an etching bath designed for a single blade or, in accordance with a second variant described in the present example, by immersing all blades in a common etching bath in a sequence of operations. Here, the disk and initially only the thinnest blade, from which no stock is removed, are protected by a masking agent against the action of the etching bath, and, in a first etching step, that amount of excess stock is removed from all non-masked blades which is required to be removed from the blade with the smallest excess stock. After the first etching step, the second blade reduced to the minimum thickness is also masked. In the next etching step, that amount of stock is removed from the remaining blades which corresponds to the material excess on the remaining thinnest non-masked blade. These operation steps are continued until the mass of the initially thickest blade is reduced to the mass of the initially thinnest blade by use of the etching solution. Blade natural frequency and stock removal can be rechecked between the individual operations.

Finally, the natural frequency of the individual blades is re-determined—as described in the above. If corresponding natural frequencies and masses are found, the process is finished. If not, the above etching process will be repeated.

Now, the blades of the BLISK have essentially identical properties with regard to mass and natural frequency, so that maximum blade amplitudes of the undamped BLISK-design blades excited by non-uniform pressure distribution in the flow path and correspondingly high blade loads are avoided. At the same time, imbalance caused by different blade masses of the rotor wheels produced to the above method is largely eliminated, with imbalance of the rotor wheel as a whole being reduced.

In accordance with a third variant, the above-described successive etching can be modified such that the rotor wheel is immersed in a common etching bath and stock is removed, individually for each blade, to the minimum reference mass determined beforehand, with all parts from which no stock is to be removed being masked.

Prior to series production of a plurality of rotor wheels according to the above described process, a test rotor wheel is fitted with strain gauges at individual, previously selected blades, assembled and, with regard to the vibrational behavior of the blades, tested in a test run for any blade loading due to excessive amplitudes using the strain-gauge results. Application of the high-temperature strain gauges to the blade surfaces, here using a ceramic adhesive, incurs an increase in the stiffness of the blade-strain gauge assembly, and thus in the natural frequency of the respective blade-strain gauge assembly, which may lead to misinterpretation of the actual properties of the rotor wheel, when checking the test rotor wheel results. Therefore, the blades of the test rotor wheel selected for the application of the strain gauges are additionally decreased in blade thickness, chord length and, consequently, blade mass and natural frequency to such an extent in the above etching process that the deviation from the blade natural frequencies of all other, non-instrumented blades expected from the application of strain gauges is compensated for and, during the test run of the test BLISKs, all blades have equal natural frequencies and, accordingly, the test result is not invalidated, despite the strain gauges applied to individual blades.

What is claimed is:

1. A method for the manufacturing an integrally designed rotor wheel for at least one of a compressor and a turbine, the rotor wheel including a disk with rotor blades formed on the periphery of the disk, the method comprising:
    providing a rotor wheel formed by a manufacturing process, the formed rotor wheel including a disk and rotor blades, the rotor blades formed on the periphery of the disk,
    measuring the natural frequency of each individual rotor blade of the formed rotor wheel,
    determining a blade mass of each individual blade via a dependency existing between the blade natural frequency and the blade mass,
    determining for each blade a respective mass difference between the mass of the blade and the mass of the blade exhibiting the smallest mass, and
    removing the respective mass difference from each blade with an etchant, so that all blades exhibit an essentially identical mass and an essentially identical natural frequency.

2. The method of claim 1 further comprising removing the respective mass difference from each blade by immersing the blade for a specified period of time in an etching solution of a specified concentration.

3. The method of claim 2 further comprising completely immersing the rotor wheel in the etching solution and removing the respective mass difference from each blade in a sequence of etching operations until all blades exhibit an essentially identical mass and an essentially identical natural frequency, and covering the disk of the rotor wheel and any blades that are not to be treated with a masking agent prior to each etching operation.

4. The method of claim 2 further comprising completely immersing the rotor wheel in the etching solution, and removing the respective mass difference from each blade during single individual etching operations until all blades exhibit an essentially identical mass and an essentially identical natural frequency, and covering the remaining rotor wheel portions with a masking agent prior to the each individual etching operation.

5. The method of claim 2 further comprising completely immersing each blade in an etching bath adapted to a size of the single blade and removing the mass respective difference from each blade in single individual etching operations until all blades exhibit an essentially identical mass and an essentially identical natural frequency.

6. The method of claim 1 further comprising, prior to series production of the rotor wheel, subjecting a test rotor wheel fitted with strain gauges to a test run under operating conditions, and compensating for a stiffening and an increase in natural frequency of each blade due to the application of the strain gauges by increasing the amount of material removal during the etching of each blade that was fitted with the strain gauges.

7. The method of claim 1 further comprising: measuring the natural frequency of each individual blade in a state in which the blade under test is largely decoupled from the remaining blades which have been detuned by applying an additional mass to each remaining blade, exciting the blade under test using a modal hammer and measuring the natural frequency of the blade under test using a laser vibrometer.

8. The method of claim 1 wherein the manufacturing process is performed by at least one of milling, electrochemical machining and friction welding.

* * * * *